United States Patent [19]
Lecomte

[11] Patent Number: 6,077,113
[45] Date of Patent: Jun. 20, 2000

[54] MODULAR CROSS-CONNECT PANEL FOR DATA NETWORKS

[75] Inventor: Didier Lecomte, Cavaillon, France

[73] Assignee: Alcatel, Paris, France

[21] Appl. No.: 09/010,060

[22] Filed: Jan. 21, 1998

[30] Foreign Application Priority Data

Jan. 23, 1997 [FR] France ................................. 97 00683

[51] Int. Cl.[7] ................................................ H01R 13/60
[52] U.S. Cl. ...................................... 439/540.1; 439/471
[58] Field of Search ............................... 439/540.1, 532, 439/471, 474, 464

[56] References Cited

U.S. PATENT DOCUMENTS

| | | | |
|---|---|---|---|
| 4,302,624 | 11/1981 | Newman | 174/67 |
| 4,322,575 | 3/1982 | Skipper | 174/20 |
| 4,908,335 | 3/1990 | Cosmos et al. | 439/79 |
| 5,083,941 | 1/1992 | Rodgers et al. | |
| 5,167,530 | 12/1992 | Wallgren et al. | 439/540 |
| 5,288,251 | 2/1994 | Sumida | 439/701 |
| 5,470,244 | 11/1995 | Lim et al. | 439/189 |
| 5,569,040 | 10/1996 | Sumida | 439/157 |
| 5,647,763 | 7/1997 | Arnold et al. | 439/540.1 |

FOREIGN PATENT DOCUMENTS

0658059A1 4/1995 European Pat. Off. .
29519388 U1 3/1996 Germany .

*Primary Examiner*—Gary F. Paumen
*Assistant Examiner*—Truc Nguyen
*Attorney, Agent, or Firm*—Sughrue, Mion, Zinn, Macpeak & Seas, PLLC

[57] ABSTRACT

The modular cross-connect panel for cable lines of cabled networks comprises a support assembly defining a vertical front portion and a horizontal rear portion, together with female connectors retained on the front portion and connected to the lines of cables fixed on the rear portion. In the panel said support assembly comprises two separate rigid supports referred to as a "front" support and as a "rear" support, together with two assembly columns fixed to the front support and releasably holding the rear support. The panel is applicable to a distribution frame for use in operating cable networks.

14 Claims, 4 Drawing Sheets

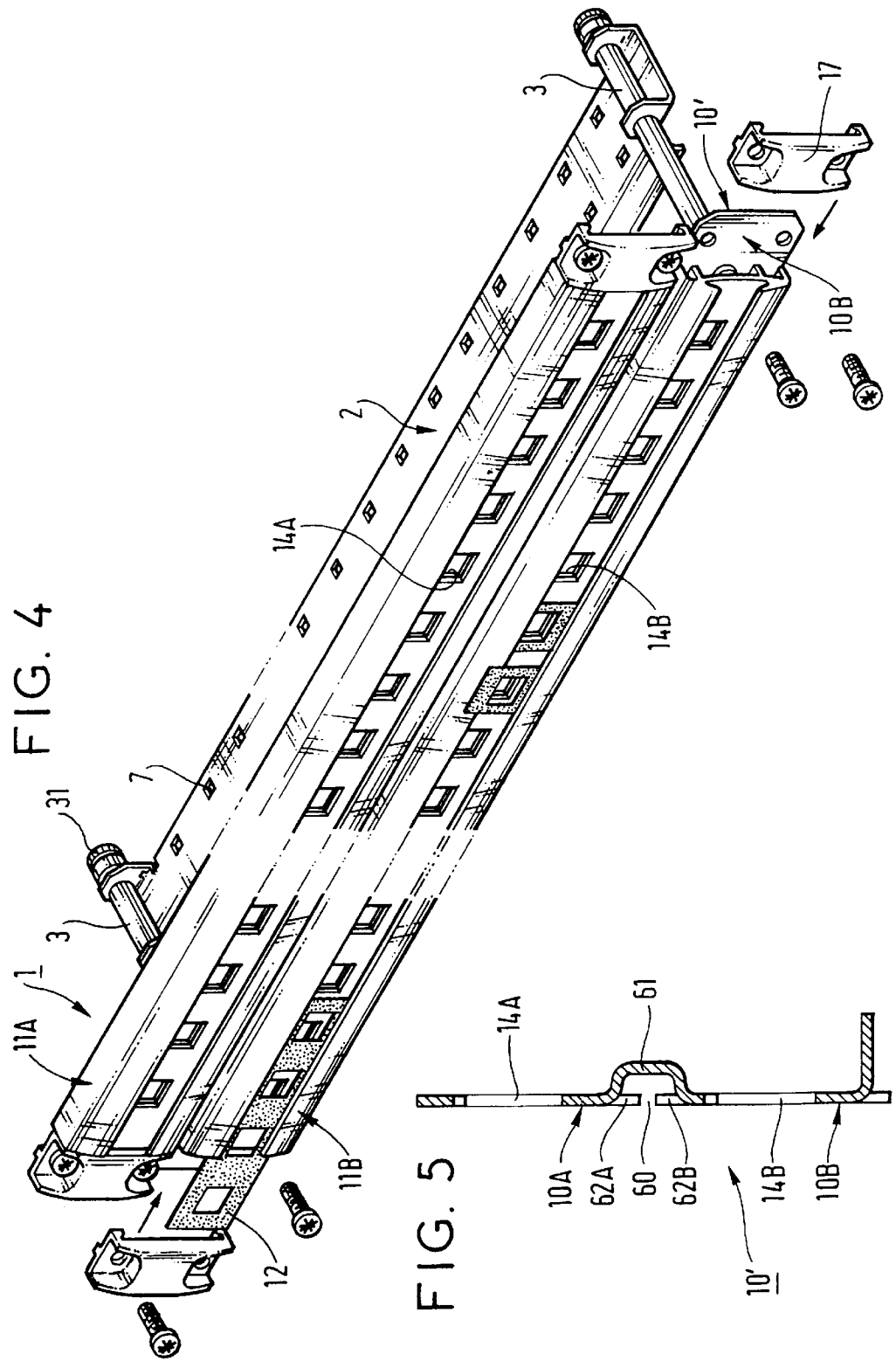

MODULAR CROSS-CONNECT PANEL FOR DATA NETWORKS

The present invention relates to managing cable data networks in buildings. It relates more particularly to a cross-connect panel for use in a distribution frame that may be in the form of a wall cabinet, a rack, or a bay, for the purpose of managing initially cabled data networks.

BACKGROUND OF THE INVENTION

In such video and/or computer and/or telephone data networks, the term "inlet cable" is used below to designate a multiline cable on the source side, i.e. connected to a source of data or to an exchange, the term "trunk cable" is used to designate a likewise multiline cable for transmission from one distribution frame to another, generally from one floor to another or possibly from one building to another, and the term "user cable" issued to designate a single line cable connected to a fixed user jack for connection to a piece of equipment.

These various types of cable may all be symmetrical pair electric cables. They terminate at the rear of distribution frames. The cables serving one of the distribution frames are connected to front female connectors mounted on modular cross-connect panels of the distribution frame. An inlet or trunk cable is connected to another trunk or user cable by means of a cross-connect cord fitted with two end male connectors that plug into two female connectors selected from those on the cross-connect panels of the distribution frame.

In a variant, the inlet and user cables are symmetrical pair cables while the trunk cables are optical fiber cables. Under such conditions, the optical trunk cables can terminate at each end on interface circuits associated with the distribution frames for the purpose of performing optical to electrical conversion and vice versa and enabling the manufacture of female connectors for the distribution frames to be rationalized in chat they are then all identical to each other in the distribution frames.

Document EP-A-0 564 336 describes a modular device for terminating electric cables, which device is initially mounted on each electric cable to enable it subsequently to be connected quickly to a connector on a cross-connect panel or to a user jack, depending on the type of cable concerned. That device includes a block provided with blind housings provided for the various wires of the cable, at least one cavity opening out into said housings, and slots each passing through one of the housings, and a locking piece received in each cavity and provided with a flexible tongue for retaining the wire inserted in its housing.

Subsequent connection of the cable to one of the connectors of a cross-connect panel or to a user jack is performed simply using insulation-displacement contacts. These contacts are carried by and connected to a printed circuit, and each of them has its insulation displacement end inserted in one of the slots of the cable terminating device so as to be connected to the wires in place in the respective housings. The printed circuit carries the connector or the jack and is connected to the internal pins of the connector or jack which are accessible via the plugging face of the connector or jack.

The connectors on the cross-connect panel or the user jacks may in particular be of the RJ45 type.

For reasons particularly of reducing the cost of installing cable networks, it is presently preferred to avoid fitting each cable with its own termination device. Under such conditions, the wires of each line of the cable are directly connected to the insulation displacement contacts of a cross-connect connector or of a user jack. A panel is then provided having a rear portion used for fixing cables while its front portion is used for holding connectors.

The operations of fixing cables to the rear portion of the cross-connect panel and of connecting said cables to the connectors of the panel are often lengthy and difficult. In addition, it is observed that the rear portion of the cross-connect panel often gives rise to the cables being injured or subjected to excessive stresses, depending on whether they come up from the floor or down from the ceiling.

OBJECTS AND SUMMARY OF THE INVENTION

An object of the present invention is to solve those problems.

The invention provides a modular cross-connect panel for cable lines of cable networks, the panel comprising a support assembly defining a substantially vertical front portion and a substantially horizontal rear portion, together with female connectors, said connectors being removably mounted to said front portion to be accessible via a front face thereof, and also being connected to the lines of cables fixed to said rear portion, wherein said support assembly comprises: two rigid elongate supports that are separate from each other, being referred to as a "front" support and as a "rear" support and corresponding to said above-defined front and rear portions; rigid assembly columns fixed to said front support and projecting perpendicularly from the rear thereof; and removable fixing means for fixing said rear support to said columns, said front support being provided with openings for removably holding respective ones of said connectors.

The panel may advantageously present at least one of the following additional characteristics:

it includes a front section member assembled on said front support to cover the front face thereof, and provided with openings leaving access to said connectors mounted on said front support;

it includes identification elements for identifying said lines connected to said connectors mounted on said front support, said identification elements being retained on the front face of the section member in place on said front support, and each surrounding the opening of said section member that leaves access to the connector mounted on said front support and connected to the line identified in this way;

it includes masking elements retained on the front face of the section member in place on said front support and covering respective openings of said section member, in the absence of a connector that is accessible therethrough;

said rear support is in the form of an elongate plate whose two longitudinal edges are folded towards the same side and present rounded fold lines, with the terminal portions of said edges being folded towards the other side and pierced with respective holes to define pairs of facing tabs on said rear support for holding it on the columns;

each of said connectors comprises a front body of an RJ45 jack fitted with front catches for engaging said front support, a rear terminal block retained on the rear of said front body and fitted internally with two rows of contact elements each having an insulation displacement rear portion and a front portion in the form of a resilient spring, and a printed circuit card that is both retained in said terminal block between the front portions of said contact elements, with its printed circuit being in connection with said contact elements, and is also received in said front body of an RJ45 jack, having its printed circuit connected to the contact springs of said jack; and said contact springs are carried by an insulating insert itself mounted on a front portion of the card of said printed circuit having said contact springs firstly connected to said printed circuit and secondly projecting obliquely crossing the insert and extending towards the rear of the printed circuit card, thereby enabling them to be received in said front body of an RJ45 jack.

BRIEF DESCRIPTION OF THE DRAWINGS

The characteristics and advantages of the present invention appear from the description of a preferred embodiment given by way of non-limiting example and shown in the accompanying drawings. In the drawings:

FIG. 4 is a perspective view of a double-height cross-connect panel constituting a variant of the FIG. 1 panel; and FIG. 5 is a section view of a front support of the FIG. 4 panel.

MORE DETAILED DESCRIPTION

Figure 1:
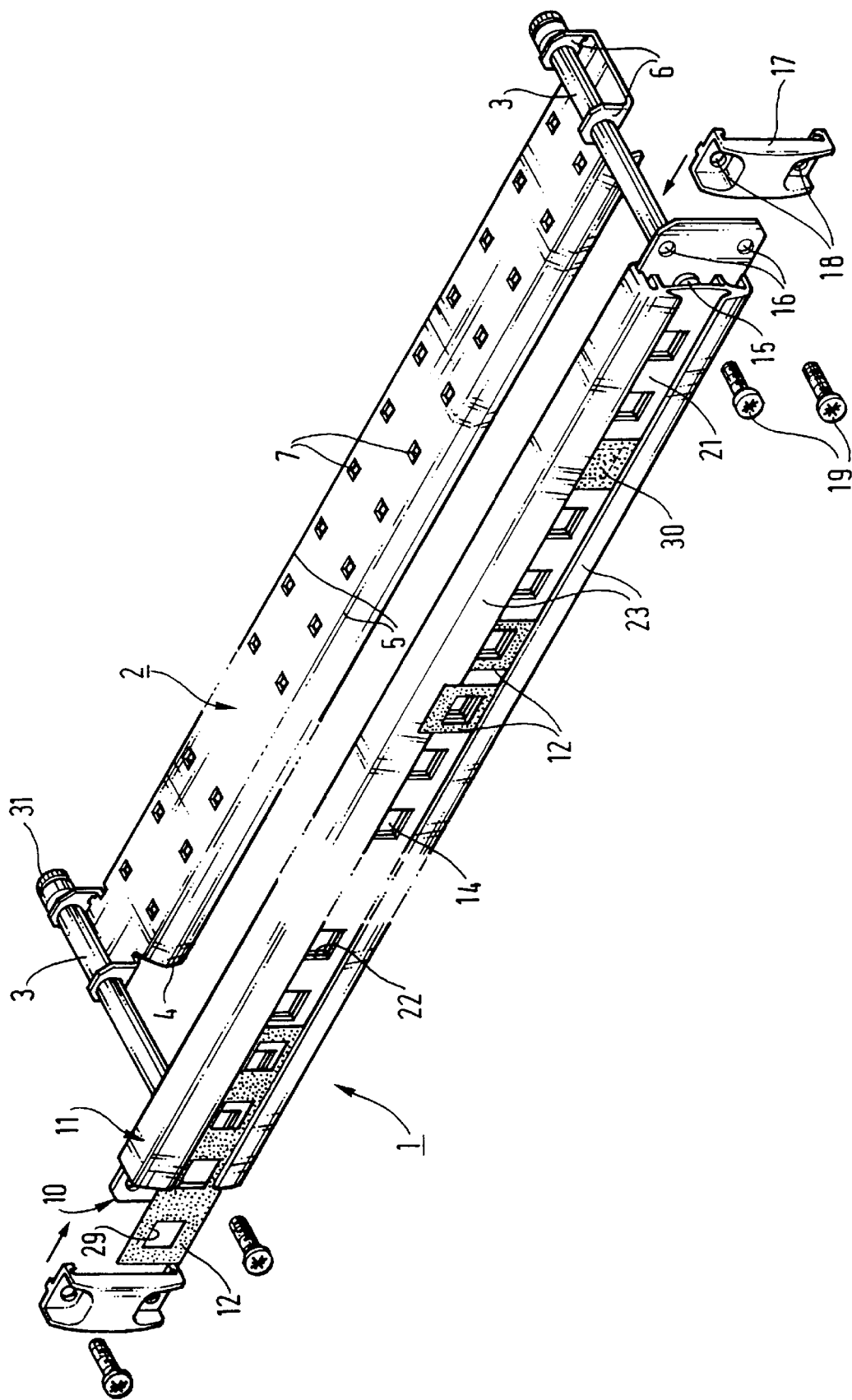
FIG. 1 is a perspective view of a cross-connect panel of the invention, without the connectors mounted thereon and without the cables connected to the connectors.
Figure 2:
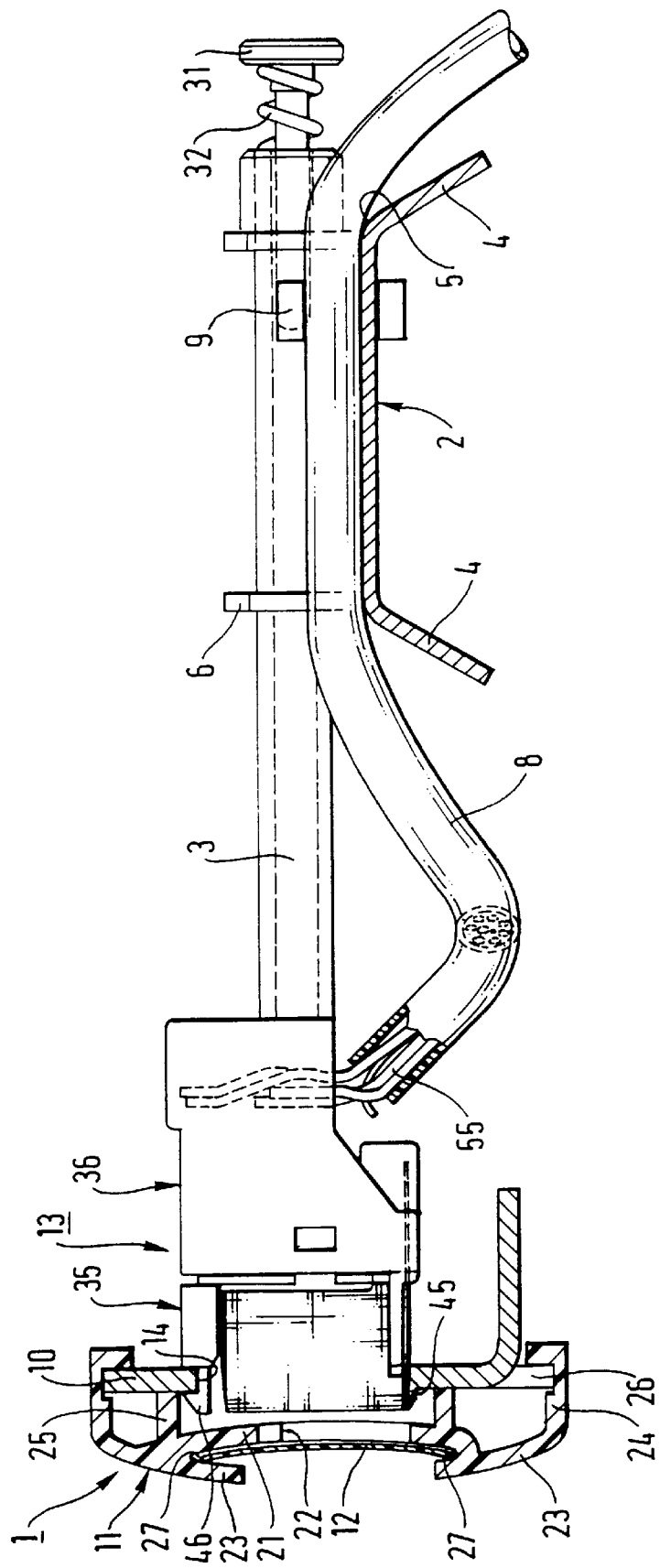
FIG. 2 is a section view of the FIG. 1 panel, shown fixed to a connector and to a cable which is connected to the connector.

With reference to FIGS. 1 and 2, it can be seen that the cross-connect panel of the invention comprises a support assembly having a vertical front portion 1, a horizontal rear portion 2, and two horizontal columns 3 for assembling the rear portion to the front portion.

The rear portion 2 is a metal plate constituting a rear cable support, and both its longitudinal edges 4 are folded towards the same side of the initial plate, thereby forming two longitudinal rounded fold lines 5 thereon, with the exception of the end portions of said edges which are folded towards the other side of the initial plate, and define two pairs of tabs 6 for fastening the rear cable support 2. Each tab 6 is pierced by a hole, with the holes in the two tabs 6 of each pair being in register and receiving a respective one of the two assembly columns 3.

The rear cable support is thus substantially of channel section to give it good stiffness. It has two longitudinal series of holes 7 formed through the web of its channel shape. Each cable, such as the cable 8, is received across the width of the support and is fixed to the outside surface of the web by means of a cable-clamp 9, itself fixed in one of the holes 7. The rounded fold lines 5 between the web and the flanges ensure that there are no sharp edges which could injure the cables.

The front portion 1 comprises a metal plate constituting a front connector support 10, a plastics section member 11 covering the front face of the connector support and held on said support, and clips 12 for identifying connectors such as 13 when they are in place on the support 10. The clips 12 are retained by the section member.

The front connector support 10 is pierced by a longitudinal series of identical openings 14, each for receiving and holding the "plugging" front face of a respective one of the connectors. The front support is slightly longer than the rear cable support 1. At its two terminal portions, it carries the two assembly columns 3 that project from its rear face, each being fixed by means of a screw 15 inserted from the front face of the end portion of said front support 10. On each of its two terminal portions, the front support also has two superposed holes 16 which are covered by an endpiece 17 applied against the front face of each terminal portion and itself provided with two corresponding holes 18. The holes 16 and 18 enable screws 19 to fix the cross-connect panel onto two uprights (not shown) of a cabinet, a rack, or a wall box.

The plastics section member 11 and the two endpieces 17 cover the front face of the connector support 10 over the full length thereof.

The middle portion 21 of the plastics section member 11 is rounded in shape, being semicylindrical or elliptical, with its concave side facing forwards when the section member is in place on the support 10. This middle portion includes a longitudinal series of access openings 22 through which access is provided to the connectors retained in the openings 14 of the support 10.

On each of its two margins situated above and below its middle portion 21, the plastics section member 11 has a slightly rounded front portion 23 whose convex surface faces forwards, and a retaining rear portion 24 folded back from the front portion. Substantially at the junction between the middle portion 21 and each of the front margins, the plastics section member has a rear tab 25 for bearing against the support 10. The rear tabs 25 press against the front face of the support 10 when the rounded retaining portions 24 are engaged on the support 10. For this purpose, the end edges of the rear portions extend inwards. The support 10 is shown as being of angle section except at its ends, and it has punched-out tabs 26 at the junction between its two flanges and extending the vertical front flange, to enable one of the two rear retaining portions 24 of the section member 11 to engage behind them.

The two front portions 23 above and below the middle portion 21 of the section member 11 project a little in front of said middle portion 21. They co-operate therewith to define two longitudinal grooves 27 for retaining identification clips 12 of connectors retained on the support 10.

The plastics section member 11 is preferably a plastics extrusion, that withstands fire but that is advantageously free from halogens.

The identification clips 12 are constituted by flat and flexible elements of rectangular shape and in color, they may be independent of one another or a plurality of them may be secured to one another to form a kind of tape. They are removably mounted on the section member 11, surrounding the plugging accesses of any connectors in place on the support 10, and are therefore pierced by respective windows 29 which overlie respective openings 22 in the section member 11.

Each identification element or each group of interconnected identification elements is put into place so as to bear against the middle surface 21 of the section member and surround one or more successive openings 22 with the two opposite edges of the element being retained in the two grooves 27. As a result, each element surrounds the entire periphery of the plugging access of a connector in place on the support 10 so as to be clearly visible even when a cross-connect cord is connected to the connector carried by the support 10.

The cross-connect panel may also receive masking elements 30 removably mounted on the section member 11 in similar manner to the identification elements. The masking elements differ from the identification elements in color and by the absence of a window, such that each masking element covers and closes the opening 22 over which it extends. Each masking element serves to cover one of the above-mentioned openings either when there is no connector behind the opening or else when there is a connector behind the opening but it is not in use, with the masking element thus protecting it against dust, in particular.

The columns 3 for assembling the supports 2 and 10 together are cylindrical rods having respective bores, which bores are tapped, at least in their end portions. Their front ends are fixed to the support 10 by respective screws such as 15. The rear end of each column is engaged in the hole through one of the tabs in the corresponding pair of tabs 6 of the support 2. The rear end is retained pressed against the other one of said tabs by a screw 31. The screw 31 is mounted so as to be captive on said other tab. It is resiliently biased by a spring 32 mounted around its shank and it is thus received in the rear end of the bore of the column 3.

The connectors received on the cross-connect panel are identical to one another. Each connector has a front jack, preferably of the RJ45 type, for connection to a cross-connect cord, and the cable lines of the networks initially cabled in a building are connected to respective ones of the connectors.

Figure 3:
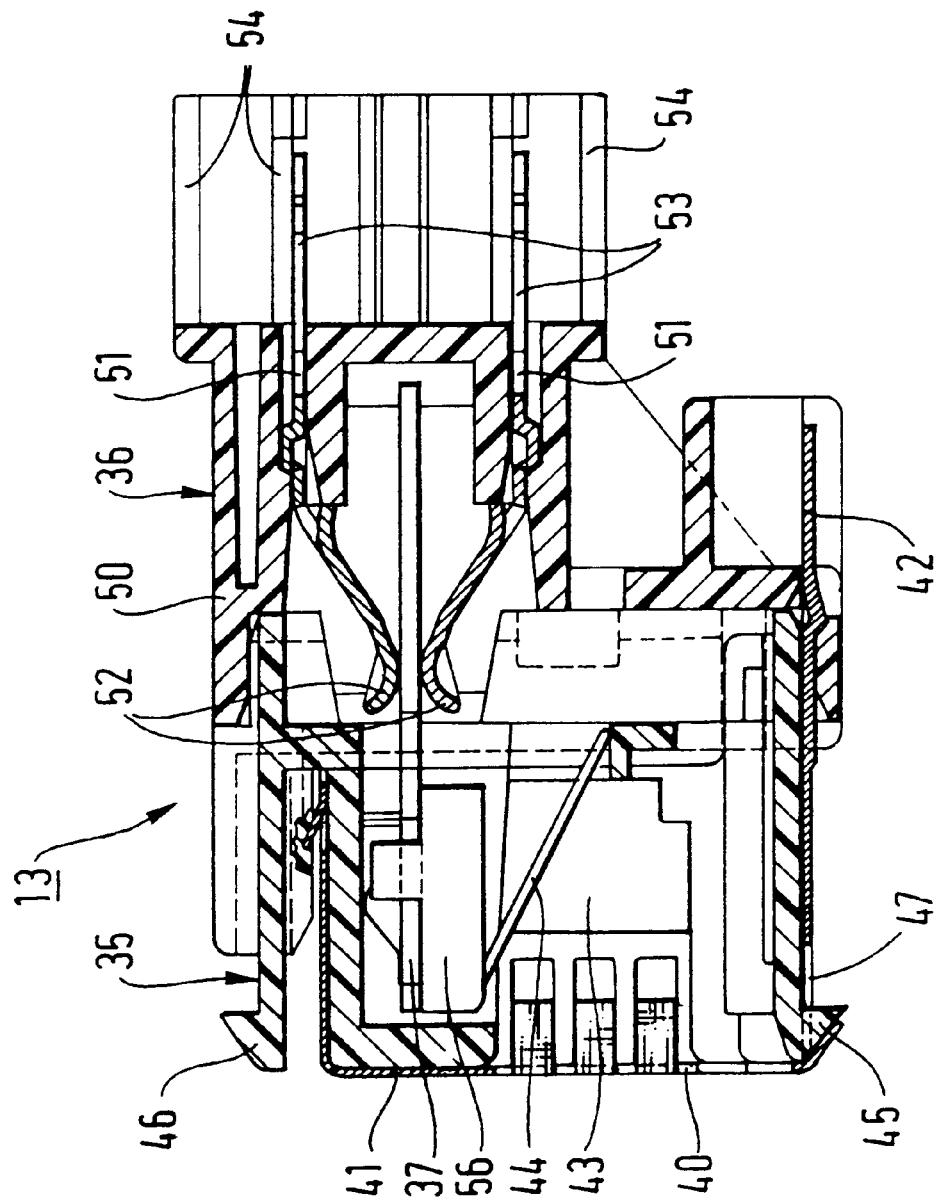
FIG. 3 is a section view of the above-mentioned connector.

A connector 13 is described with reference to FIGS. 2 and 3. It comprises an insulating front body 35 of an RJ45 jack, a rear terminal block 36 snapped onto the rear portion of the front body, and a printed circuit card 37 extending inside the front body and the terminal block.

The insulating body 35 has a plugging access 40 in its front face for receiving a male RJ45 connector of a cross-connect cord. Its rear face is open. It carries a peripheral shielding case 41 covering its four side faces and the periphery of the plugging access in its front face. The shielding case 41 has a ground connection tab 42 which projects rearwards from the body 35 to be received in the terminal block 36 while still being accessible.

The insulating body 35 contains a substantially rear series of support teeth 43 extending between a series of individual contact springs 44 of the connector. The contact springs of the connector 13 are accessible from the plugging access 40. On the outside, in the vicinity of the front portions of its bottom and top side faces, the body 35 has catches 45 and 46, comprising a rigid catch 45 defined on the body 35 and a flexible catch 46 defined at the end of a flexible tab secured to the rear portion of the body 35, said catches serving to hold the connector in one of the openings of the front support 10. The shielding case has a window 47 through which the rigid catch 45 passes, and the flexible catch 46 remains outside the shielding case. On the rear portions of its two other side walls, the body 35 has means (not shown) for retaining the terminal block on the front body 35.

The terminal block 36 comprises an insulating body 50 in which eight contact elements 51 are retained in two rows, and are insulated from one another. These contact elements have their front terminal portions 52 organized in pairs to form four spring clips, which between them receive the printed circuit 37, thereby connecting the elements to said printed circuit. Their rear portions 53 are split to perform the insulation-displacement function and are accessible through slots 54 in the rear portion of the bottom and top walls of the body of the terminal block. These slots 54 constitute wire guides for the wires 55 of one of the lines of a cable to be connected to the contact elements 51.

The printed circuit card 37 has its rear portion received between the contact elements and connected thereto. At its front portion it carries an insulating insert 56 for holding the eight contact springs 44. These contact springs are held in the insert between the insert and the printed circuit card, thereby connecting them to the card. They also project to cross the insert obliquely from its front edge towards the rear of the assembly comprising the insert and the printed circuit card, to be received between the teeth 43 of the insulating body 35.

When each connector is installed on the front support 10, the connector projects horizontally from the rear of the support, with the insulation displacement rear portions 53 of its contact elements 51 extending horizontally and accessible from the rear of the connector. It is thus easy to connect the wires 55 of a line or cable 8 to the connector.

The type of line connected in this way to the connector 13 is then identified by the identification element 12 mounted on the front plastics section member 11.

The cross-connect panel of the invention as described above is a single-height panel, of structure that is optimized for very easy connection of the lines of an inlet or trunk cable or of user cables to connectors received in the panel, and also for quick and easy fixing of cables to the panel and for identifying the lines serving the panel without difficulty. It enables cables to be installed and removed relative to the connectors to which they are connected. It enables cables to be fixed to their rear support which can itself be fixed to any one of the front supports of a plurality of panels in a distribution frame or cabinet, without any need to remove the front supports of the panels.

It may also be observed, in particular with reference to FIG. 1 or 2, that the rear support 2 whose channel section is shown downwardly open is used for fixing cables that all come up from below, i.e. from the floor, and that are fixed to the outside of the web of the channel. The same rear support 2 is used the other way up, i.e. with the channel being open upwardly, when it is fixed to cables that all come down from the ceiling, with the cables again being fixed on the outside of the web of the channel.

The cross-connect panel in the variant shown in FIG. 4 is a double-height panel compared with that of FIGS. 1 and 2. Below, only the differences between this double-height panel and the single-height panel of FIGS. 1 and 2 are described in detail with reference to FIGS. 4 and 5. In particular, the connectors received in this panel are the same as before, it being possible to install twice as many of them.

The front support 10' for the connectors is of twice the height so as to be equivalent to two of the above-described front supports 10. It is constituted by two single-height front supports 10a and 10b mounted one above the other. They leave a discontinuous middle gap 60 between them and they are connected together by omega-shaped deformations or folds 61. These folds are bridges across the gap 60 and extending towards the rear of the resulting support 10'. The double-height support 10' has two rows of openings 14A and 14B for retaining two rows of connectors therein. It may be observed that the two edges 62A and 62B defining the gap 60 in the middle portion of the double-height panel are straight but are truncated lengthwise to enable the folds 61 to be made in the bridges between the gaps.

The front portion 1' of the double-height panel has two plastics section members 11A and 11B covering the front face of the double-height support 10', i.e. the front faces of the supports 10A and 10B. These two section members are identical to the above-described section member 11, with the bottom retaining edge of the top section member 11A and the top retaining edge of the bottom section 11B engaging the edges 62A and 62B of the gap 60.

With reference to FIG. 4, it can be seen that the double-height cross-connect panel advantageously has only one rear support 2 for fixing to the cables serving the panel. The rear support 2 is identical to that of the single-height cross-connect panel. It can be installed either way up so that its channel section is open downwards or upwards.

In a variant, it would naturally be possible to fix two rear supports such as 2 to a single double-height front support 10', and each rear support could be given either desired orientation.

In the panel described above with reference to the accompanying drawings, the connectors are electric connectors that are advantageously of the standard RJ45 type, which are connected to the lines of electric cables or which can be connected to the lines of optical cables via interface converters. Naturally, in a variant, the connectors could be optical connectors, in particular of standard types ST or SC, and which are then connected to the lines of optical cables or via interface converters to the lines of electric cables.

What is claimed is:

1. A modular cross-connect panel for cable multiwire-lines of cable networks, the panel comprising:
   a substantially vertical elongate and rigid front support;
   a substantially horizonal elongate and rigid rear support for fastening cables;
   connectors removably mounted to said front support to be accessible via a front face thereof, and also connected to the multiwire-lines of cables fixed to said rear support;
   rigid assembly columns fixed to said front support and projecting perpendicularly from a rear thereof; and
   removable fixing means for fixing said rear support to said columns, said front support being provided with openings for removably holding respective ones of said connectors.

2. A panel according to claim 1, including a front section member assembled on said front support to cover the front face thereof, and provided with openings leaving access to said connectors mounted on said front support.

3. A panel according to claim 2, including identification elements for identifying said lines connected to said connectors mounted on said front support, said identification elements being retained on the front face of the section member in place on said front support, and each surrounding the opening of said section member that leaves access to the connector mounted on said front support and connected to the line identified in this way.

4. A panel according to claim 3, wherein said section member includes a curved middle portion having a concave surface which extends along a series of openings in said front support for holding said connectors, the concave surface thereof facing forwards and also having a series of openings that overlie those of said front support when the section member is in place on said front support, and including two margins situated along said middle portion, above and below it, and both projecting forwards from said middle portion, and two longitudinal grooves defined facing each other between said middle portion and said margins, said grooves serving to retain between them said identification elements.

5. A panel according to claim 3, wherein said section member includes folded longitudinal edges for retaining it on said front support.

6. A panel according to claim 3, including masking elements retained on the front face of the section member in place on said front support and covering respective openings of said section member, in the absence of a connector that is accessible therethrough or in the presence of a connector that is not in use and that is protected thereby.

7. A panel according to claim 2, wherein said section member is made of fire-resistant plastics material, that is preferably halogen-free.

8. A panel according to claim 1, wherein said rear support is in the form of an elongate plate whose two longitudinal edges are folded towards the same side and present rounded fold lines, with opposite end portions of said edges being folded towards the other side and pierced with respective holes to define pairs of facing tabs on said rear support for holding it on the columns.

9. A panel according to claim 8, wherein said columns have respective bores that are tapped, at least in the opposite end portions thereto, and said removable fixing means of said rear support are constituted by screws received in the tapped bores of the columns and held captive on the rearmost support tabs in each pair of tabs of said rear support.

10. A panel according to claim 1, wherein each of said connectors comprises a front body of an RJ45 jack fitted with front catches for engaging said front support, a rear terminal block retained on the rear of said front body and fitted internally with two rows of contact elements each having an insulation displacement rear portion and a front portion in the form of a resilient spring, and a printed circuit card that is both retained in said terminal block between the front portions of said contact elements, with its printed circuit being in connection with said contact elements, and is also received in said front body of an RJ45 jack, having its printed circuit connected to the contact springs of said jack.

11. A panel according to claim 10, wherein said contact springs are carried by an insulating insert itself mounted on a front portion of the card of said printed circuit having said contact springs firstly connected to said printed circuit and secondly projecting obliquely crossing the insert and extending towards the rear of the printed circuit card, thereby enabling them to be received in said front body of an RJ45 jack.

12. A panel according to claim 11, wherein the front body of an RJ45 jack is covered in shielding which includes a ground connection tab projecting from the rear of said front body.

13. A panel according to claim 1, wherein said front support is a "double-height" support having two series of openings for holding said connectors and constituting two single-height front supports that are separated from each other by a discontinuous gap and that are connected to each other by folded bridges formed across the gap and that extend behind it, and wherein two section members are mounted respectively on said single-height front supports with each of them being retained on one of the edges of said double-height support and on one of the edges of said discontinuous gap.

14. A panel according to claim 13, having a single rear support fixed via said columns to said double-height front support.

* * * * *